(12) United States Patent
Kuchipudi et al.

(10) Patent No.: US 12,531,154 B2
(45) Date of Patent: Jan. 20, 2026

(54) SYSTEM AND METHOD FOR SPOT CHECKING SMALL OUT-OF-CONTROL CONDITIONS IN A CLINICAL DIAGNOSTIC PROCESS

(71) Applicant: BIO-RAD LABORATORIES, INC., Hercules, CA (US)

(72) Inventors: Lakshmi Samyukta Kuchipudi, Addison, TX (US); Curtis Parvin, Mckinney, TX (US); John Yundt-Pacheco, Fairview, TX (US)

(73) Assignee: BIO-RAD LABORATORIES, INC.

( * ) Notice: Subject to any disclaimer, the term of this patent is extended or adjusted under 35 U.S.C. 154(b) by 1087 days.

(21) Appl. No.: 14/327,875

(22) Filed: Jul. 10, 2014

(65) Prior Publication Data

US 2016/0012191 A1    Jan. 14, 2016

(51) Int. Cl.
*G16H 50/20*    (2018.01)
*G16H 10/40*    (2018.01)
*G16H 40/40*    (2018.01)

(52) U.S. Cl.
CPC .............. *G16H 50/20* (2018.01); *G16H 10/40* (2018.01); *G16H 40/40* (2018.01)

(58) Field of Classification Search
CPC ........ G01N 35/00; G16H 50/20; G16H 10/40; G16H 40/40

(Continued)

(56) References Cited

U.S. PATENT DOCUMENTS 6,656,428 B1 * 12/2003 Clark ..................... B01L 3/502
                                                       422/404
8,099,257 B2    1/2012 Parvin et al.
(Continued)

FOREIGN PATENT DOCUMENTS

EP    2980716 A1    2/2016
JP    2002022748    *    1/2002 ............. G01N 35/00

OTHER PUBLICATIONS

David A. Armbruster et al., "Clinical Chemistry Laboratory Automation in the 21st Century—Amat Victoria curam (Victory loves careful preparation)", Clin Biochem Rev 35 (3) 2014, pp. 143-153.*

Primary Examiner — Alexander Satanovsky
(74) Attorney, Agent, or Firm — AVEK IP, LLC; Mark C. Young

(57) ABSTRACT

Disclosed are a system and method to automatically spot-check for small out-of-control conditions of a clinical diagnostic process. The expected number of unreliable results evaluated since the last good quality control event is estimated by estimating the magnitude of the out-of-control condition, constructing concentration based bias, imprecision, and $TE_a$ profiles, and using those parameters to estimate the probability of a specimen result being unreliable. Patient specimens are automatically selected for reevaluation based on their probability of crossing a medical decision limit or having a probability of being unreliable. The system and method determine which reevaluated patient specimens need to be corrected when the results for those specimens have already been reported. Various exemplary embodiments and implementations of the system and method are included.

16 Claims, 4 Drawing Sheets

(58) Field of Classification Search
USPC ............... 702/19, 82, 104, 119, 179; 422/58
See application file for complete search history.

(56) References Cited

U.S. PATENT DOCUMENTS

| | | | |
|---|---|---|---|
| 2001/0024791 A1* | 9/2001 | Elsas, II ............... | C12Q 1/6883 |
| | | | 536/23.1 |
| 2003/0101012 A1* | 5/2003 | Parvin .................... | G06Q 10/10 |
| | | | 702/84 |
| 2005/0125186 A1* | 6/2005 | Parvin .................... | G16H 10/60 |
| | | | 702/119 |
| 2012/0330866 A1 | 12/2012 | Parvin et al. | |

* cited by examiner

SYSTEM AND METHOD FOR SPOT CHECKING SMALL OUT-OF-CONTROL CONDITIONS IN A CLINICAL DIAGNOSTIC PROCESS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention relates to clinical diagnostic processes, and more particularly to a system and method for spot-checking small out-of control conditions in such processes.

2. Description of Related Art

Clinical diagnostic laboratories employ various quality control schemes to control clinical diagnostic processes to ensure the accuracy of diagnostic results. In the United States, Westgard is a well-known scheme, with other schemes, such as RiliBAK, more common outside of the U.S. More recently developed patient-data based schemes, such as the Biometric Quality Control process as described in U.S. Pat. No. 8,099,257, are also becoming widely used.

Regardless of the specific quality control (QC) process employed, a common characteristic of known QC processes is that eventually all such processes will fail in some manner. Those failures can be generally divided into two categories: stop failures, in which the entire testing system or process is halted; and run failures, in which the testing system or process continues, but is producing potentially erroneous results. A failure in which the clinical diagnostic process continues to run is commonly referred to as an out-of-control condition—i.e., the diagnostic process is still operating, but is not operating within desired parameters. An out-of-control condition affects all of the specimens evaluated while the out-of-control condition exists, namely in the form of increased amount of measurement error in the evaluation. Only when the measurement error in a result exceeds a predetermined level (i.e., an allowable total error $TE_a$) is the result deemed to be unsuitable or unreliable. If the out-of-control condition is large, it may render all specimens evaluated during the existence of the condition to be unreliable. However, if the out-of-control condition is small, it may render only a fraction of the specimens evaluated during the existence of the condition to be unreliable.

Out-of-control conditions in clinical diagnostic processes can remain undetected for long periods of time. Because the patient specimens being analyzed themselves have unknown analytical concentrations, it is difficult to determine from those specimens whether their quality has been compromised. Thus, when an out-of-control condition is finally detected, a laboratory is obligated to identify the results which are deemed unreliable and to take corrective action to remedy the out-of control condition so that accurate and reliable results may be resumed.

One method of ensuring that accurate and reliable results are provided is to first correct the out-of-control condition, and then retest all of the patient specimens that were tested since the last known "good" state of the clinical diagnostic process. This typically is identified as the last time the quality control process has been evaluated and deemed "good". While this method ensures that all potential unreliable results are accounted for and the specimens retested, it can be overly burdensome and onerous. For example, if one-thousand specimens have been tested since the last known good condition, and an out-of-control error occurs just after specimen nine-hundred and ninety-nine, then all one thousand specimens must be retested when only the one-thousandth specimen is actually unreliable. If the occurrence of the out-of-control condition can be detected accurately, then the unreliable results can be identified and re-testing of specimens can be reduced. However, detecting and handling small out-of control conditions is very complex as it is difficult to ascertain which specimens require correction and retesting.

Thus, it is apparent that current quality control processes relying on identifying large out-of-control conditions and retesting specimens is insufficient, often leading to duplicative testing and unnecessary retesting of specimens.

BRIEF SUMMARY OF THE INVENTION

The present invention is directed to a system and method for spot checking small out-of-control conditions in a clinical diagnostic process. The system and method of the present invention automatically characterizes small out-of-control conditions and predicts the number of unreliable patient specimen results since the last known good quality control evaluation. The system and method further identifies the patient specimens at the greatest risk of being unreliable, and reevaluates or spot-checks those specimens after the out-of-control condition has been remedied. Corrections to reevaluated specimens are thus required only when warranted.

In one aspect, the system and method of the present invention provides automated spot checking of out-of-control conditions in a laboratory quality control (QC) process. In another aspect, the system and method of the present invention estimates the expected number of unreliable results evaluated since the last good QC event by estimating the magnitude of the out-of control condition, constructing concentration based bias, imprecision, and total allowable error ($TE_a$) profiles, and using those parameters to estimate the probability of a specimen result being unreliable. In yet another aspect, the system and method of the present invention automatically select patient specimens for revaluation based on the probability of the specimen passing a medical decision limit or having a high probability of being unreliable. In another aspect, the system and method of the present invention automatically determine which reevaluated patient specimens need to be corrected when the results have already been reported or published.

The automatic quality control system and method of the present invention will be described herein in conjunction with the Biometric Quality Control process of U.S. Pat. No. 8,099,257 which is incorporated by reference herein in its entirety. However, it should be understood that the system and method of the present invention may equally be used with any other quality control process, biometric or otherwise, such implementations are contemplated by and within the scope of the present invention.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings and claims. In the drawings, like reference numbers indicate identical or functionally similar elements.

BRIEF DESCRIPTION OF THE DRAWINGS

The present invention will be described in greater detail in the following detailed description of the invention with reference to the accompanying drawings that form a part hereof, in which.

DETAILED DESCRIPTION OF EXEMPLARY EMBODIMENTS

A system and method for spot checking small out-of control conditions of a clinical diagnostic process in accordance with exemplary embodiments of the present invention are depicted in FIGS. 1 through 3B. While the invention will be described in detail hereinbelow with reference to the depicted exemplary embodiments and alternative embodiments, it should be understood that the invention is not limited to the specific configurations shown and described in these embodiments. Rather, one skilled in the art will appreciate that a variety of configurations may be implemented in accordance with the present invention.

Figure 1:
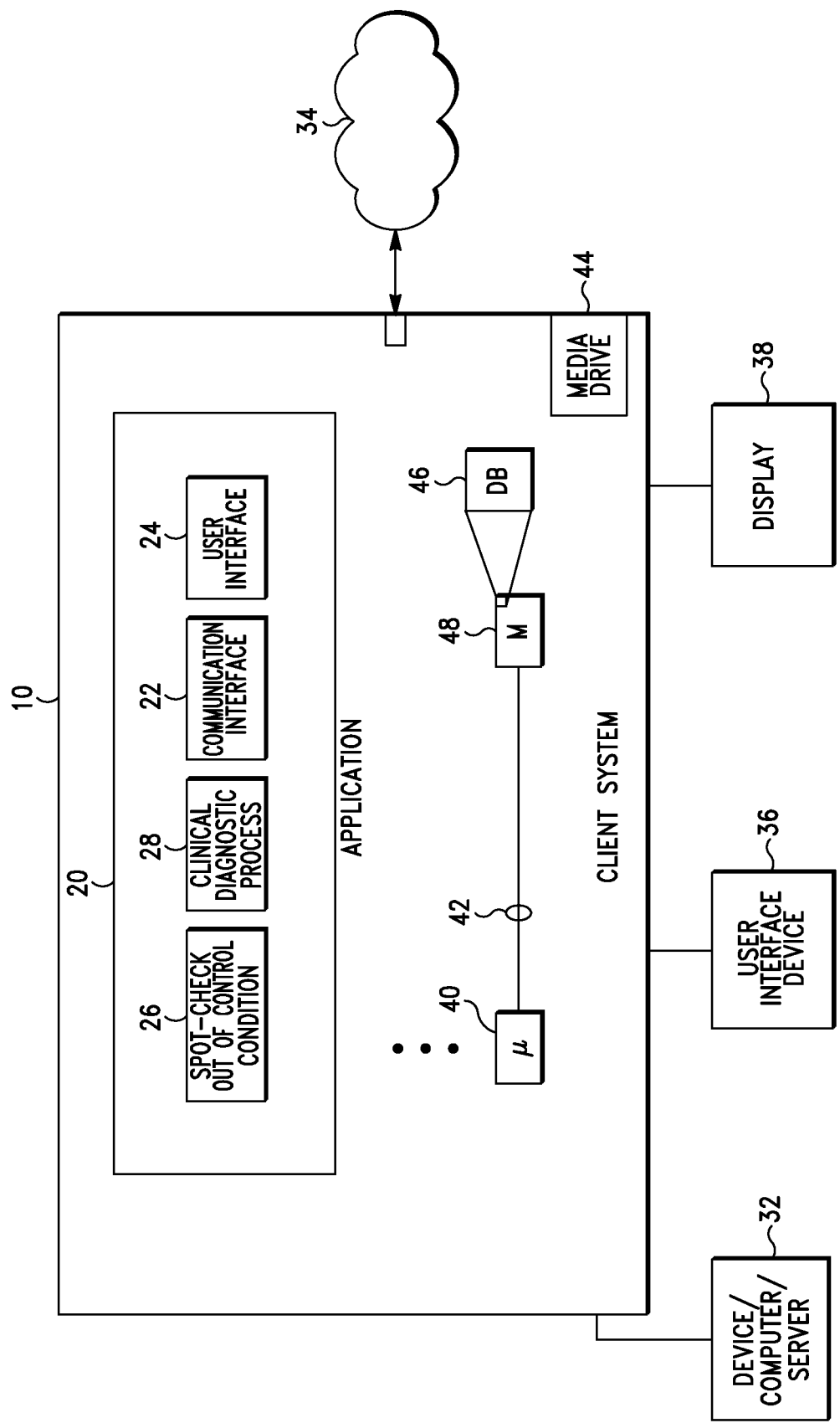
FIG. 1 depicts a block diagram of a client computer system configured with an application module for spot-checking small out-of-control conditions of a clinical diagnostic process according to a first exemplary embodiment of the present invention.
Figure 2:
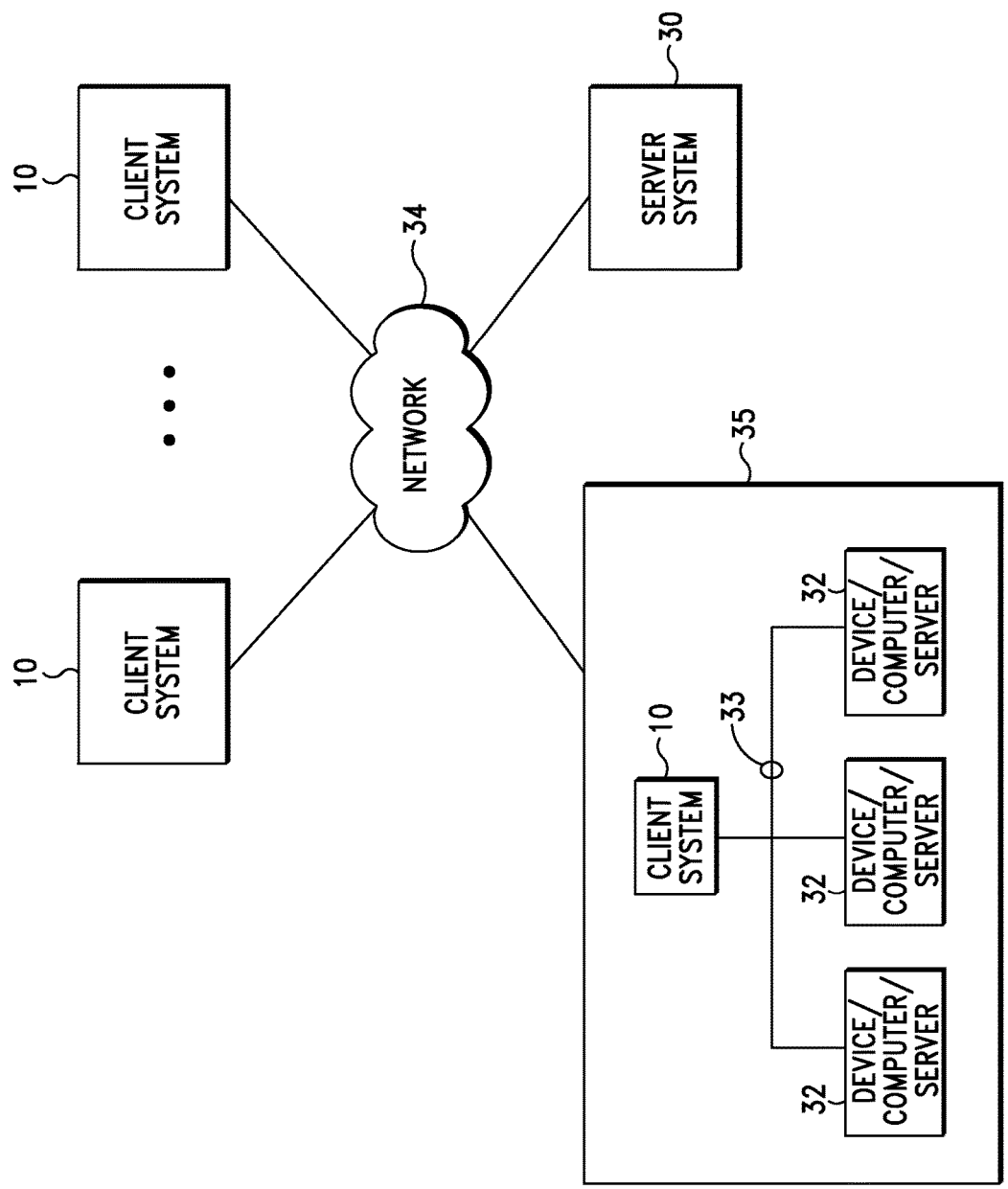
FIG. 2 depicts a block diagram of a network arrangement for executing a shared application and/or communicating data and commands between multiple computing systems and devices according to an exemplary embodiment of the present invention.

Looking first to FIGS. 1 and 2, a system client computer system (e.g., a clinical diagnostic instrument) 10 is configured with an application module 20 operable to perform testing on various analytes, such as patient specimens or quality control specimens. Application module 20 may execute any sequence of diagnostic steps or one or more diagnostic algorithms in conjunction with implementing any clinical diagnostic process, such as a hematology analyzer or any other clinical diagnostic or analytical process. As best shown in FIG. 2, a plurality of client computer systems 10 may be arranged in a network configuration for executing a shared application and/or for communicating data and commands between multiple computing systems and devices according to an exemplary embodiment of the present invention. It should be understood that client computer system 10 may operate as a stand-alone system such as a diagnostic instrument device or laboratory instrument, or it may be connected to a server system 30 and/or other client systems 10 and/or other devices/servers 32 over a network 34.

Several elements in the system depicted in FIGS. 1 and 2 are well-known, existing elements and variations of those exemplary elements may be implemented in accordance with the present invention. For example, client system 10 may include a desktop personal computer, a workstation, a laptop computer, a handheld mobile device, or any other computing device capable of executing the application module 20. In client-server or networked embodiments, client system 10 is configured to interface directly or indirectly with server system 30 over network 34. Network 34 may be any type of network known in the art, such as a local area network (LAN), a wide area network (WAN), the Internet, an ad-hoc network, or any other type of network. Client system 10 may also communicate directly or indirectly with one or more other client systems 10 and devices/servers 32 over network 34. Client system 10 preferably executes a web browsing program, such as Microsoft's Internet Explorer, Netscape Navigator, Opera or the like, allowing a user of client system 10 to access, process and view information and pages available to it from server system 30 or other server systems over network 34. Client system 10 also preferably includes one or more user interface devices 36, such as a keyboard, a mouse, a touch screen, graphical tablet, pen or the like, for interacting with a graphical user interface (GUI) provided on a display 38. Display 38 is preferably a monitor or LCD screen, but may be any type of display device known in the art.

In one exemplary embodiment, application module 20 executes entirely on client system 10 (e.g., stand-alone), however, in alternative embodiments the application module may be executed in a networked environment such as a client-server, peer-to-peer, or multi-computer networked environment where portions of the application code may be executed on different portions of the network system or where data and commands are exchanged between various components or devices executing portions of the application code. In local network embodiments, interconnection via a LAN is preferred, however, it should be understood that other networks can be used, such as the Internet or any intranet, extranet, virtual private network (VPN), non-TCP/IP based network, WAN or the like. For example, in the exemplary embodiment depicted in FIG. 2, a LAN 33 interconnects multiple devices to a client system 10. Such a network is exemplary of a multiple instrument environment 35, such as a laboratory or hospital, where multiple instruments, devices, or servers are connected to a client system 10 in a Laboratory Information System (LIS) arrangement. LAN 33 may include wireless and wired links and nodes, and use various communication protocols as are well known in the art.

Preferably, server system 30 acts as a central computer system that executes a majority of, or all, of the application module code, with each client system 10 acting as a terminal or log-in point for a user. For example, client system 10 may reside in a laboratory or a hospital multiple instrument environment 35 as part of a LIS, while server system 30 may reside in a geographically remote location. In such a configuration, the application module code is preferably executed entirely on server system 30, with data and commands sent between client system 10 over network 34. For example, if client system 10 resides in a laboratory, client system 10 would provide the required patient data and/or test results/data, and other information from a local database and local instruments and devices for processing by server system 30, which would then provide processing results back to client system 10, or to other computer systems. It should be understood that the application code may execute entirely on a single system or portions may execute on both systems 10 and 30 (or on multiple systems in other exemplary embodiments) as desired for computational efficiency purposes. Additionally, a client system 10 in a multiple instrument environment 35 may execute a portion or all of the application module code.

Looking again to FIG. 1, in an exemplary embodiment, client system 10 and some or all of its components are operator configurable through operation of the application module 20, which includes computer code executable on a central processing unit 40 coupled to other components over one or more busses 42 as is well known in the art. Computer code, including instructions for operating and configuring client system 10 (or other systems on which the application module is executing, such as server system 30 of FIG. 2) to process data content, monitor and control application processes, and render GUI images as described herein, is preferably stored on a hard disk, but the entire program code, or portions thereof, may also be stored in any other volatile or non-volatile memory medium or device as is well known, such as a ROM or RAM, or provided on any media capable of storing program code, such as a compact disk (CD) medium, digital versatile disk (DVD) medium, a floppy disk, and the like.

An appropriate media drive 44 is provided for receiving and reading documents, data and code from such a computer-readable medium. Additionally, the entire program code of module 20, or portions thereof, or related commands such as Active X commands, may be transmitted and downloaded from a software source, such as server system 30, to client system 10 or from another server system or computing device to client system 10 over the Internet as is well known, or transmitted over any other conventional network connection (e.g., extranet, VPN, LAN, etc.) using any communication medium and protocols (e.g., TCP/IP, HTTP, HTTPS, Ethernet, etc.) as are also well known. It should be understood that computer code for implementing aspects of the present invention can be implemented in a variety of coding languages such as C, C++, Java, Visual Basic, and others, or any scripting language, such as VBScript, JavaScript, Perl or markup languages such as XML, that can be executed on client system 10 and/or in a client server or networked arrangement. In addition, a variety of languages can be used in the external and internal storage of data, e.g., patient results, device and instrument information (e.g., IDs, date/time stamps, calibration information, temperature information, etc.), and other information, according to aspects of the present invention.

In an exemplary embodiment, application module 20 includes instructions for monitoring and controlling clinical diagnostic processes, as well as for providing user interface configuration capabilities, as described herein. Application module 20 is preferably downloaded and stored on media hard drive 44 (or other memory such as a local or attached RAM or ROM), although application module 20 can also be provided on any software storage medium such as a floppy disk, CD, DVD, etc. as discussed above.

In an exemplary embodiment as depicted in FIG. 1, application module 20 includes various software modules for processing data content. A communication interface module 22 is provided for communicating text and/or other data to a display driver for rendering images (e.g., GUI images) on display 38, and for communicating with device/server 32 and/or other computers or server systems in network embodiments. A user interface module 24 is provided for receiving user input, commands, and signals from user interface device 36. Communication interface module 22 preferably includes a browser application, which may be the same browser as the default browser configured on client system 10 as described previously, or any other browser or user interface application. Alternatively, interface module 22 includes the functionality to interface with a browser application executing on client system 10.

Application module 20 also includes a clinical diagnostic process module 28 that performs instructions to process data according to one or more predefined clinical diagnostic processes. For example, the clinical diagnostic process may implement a complete hematology analyzer, a specific glucose analyzer, or any other clinical analytical or diagnostic process, or any variations or combinations of those or other processes. In addition, application module 20 may include other modules operable to perform other clinical diagnostic processes or analyses or quality control processes. As will be explained in more detail below, application module 20 further includes a spot-check module 26 operable to detect small out-of-control conditions on any or all of the clinical diagnostic process operating in the application module.

Note that while the spot-check module 26 is shown as operating in conjunction with the application module 20 and in conjunction with the clinical diagnostic process 28 (or processes) executing within that module, it should be understood that the spot checking module is not necessarily itself a part of the application process, but may operate independently of that process. Thus, while the module embodying the spot-checking process of the present invention may be included in an instrument or system implementing a clinical diagnostic process and may execute on a system in conjunction with that process (as depicted in the exemplary system of FIG. 1), or may even be coded into a single executable application with that process, the spot-checking for small out-of-control conditions process of the present invention may also be used or implemented in conjunction with other clinical diagnostic processes or in a stand-alone configuration, that is contemplated by and within the scope of the present invention.

Compiled statistics (e.g., device and instrument information), patient information, and other information are preferably stored in database 46, which may reside in memory 48, in a memory card or other memory or storage system such as an attached storage subsystem RAID drive system, for retrieval by the clinical diagnostic process module 28, the spot checking module 26, and other parts of application module 20. It should be appreciated that application module 20, or portions thereof, as well as appropriate data can be downloaded to and executed on client system 10.

Figure 3A:
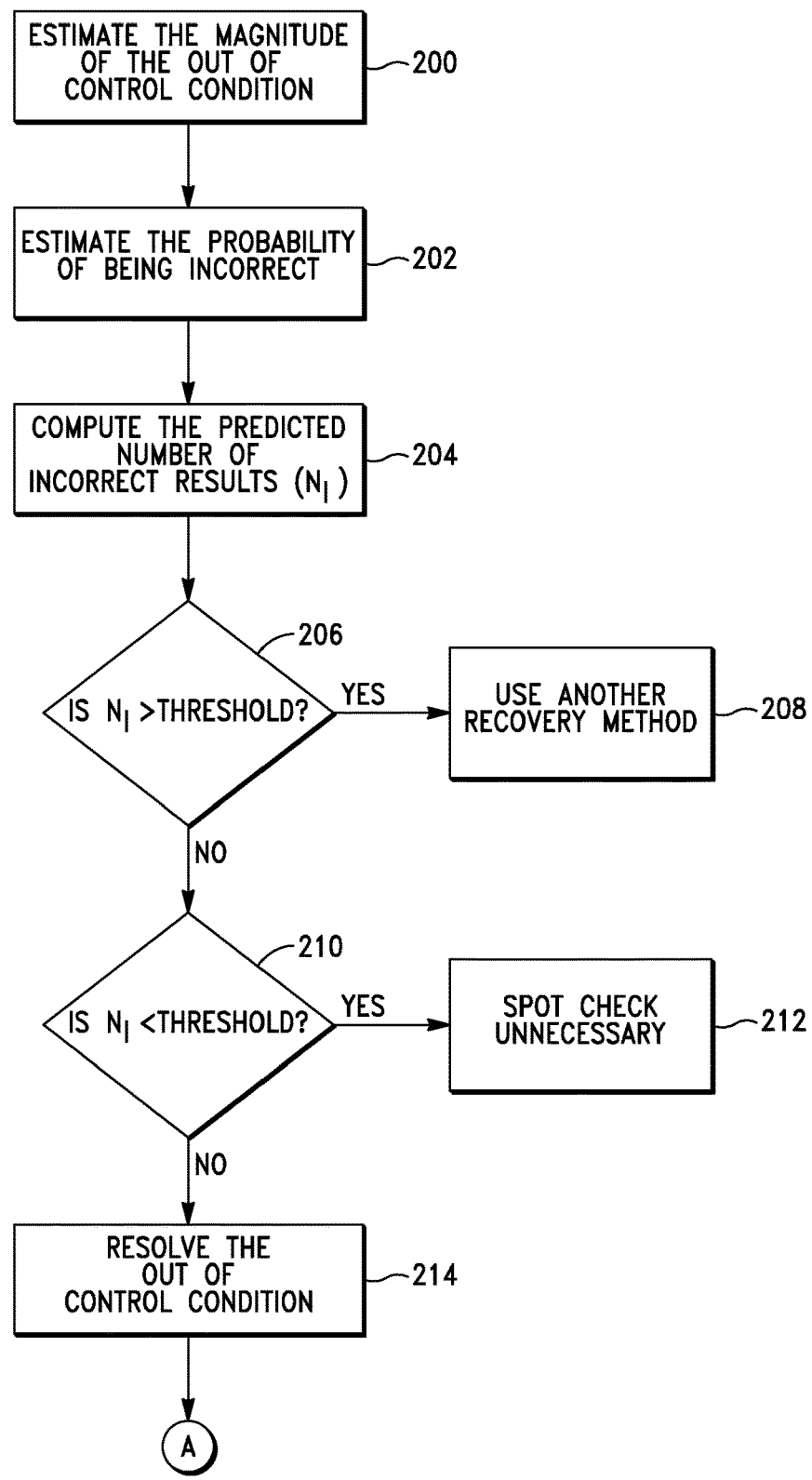
FIG. 3A depicts a first portion of a flow diagram of a process for spot-checking small out-of-control conditions of a clinical diagnostic process according to an exemplary embodiment of the present invention.
Figure 3B:
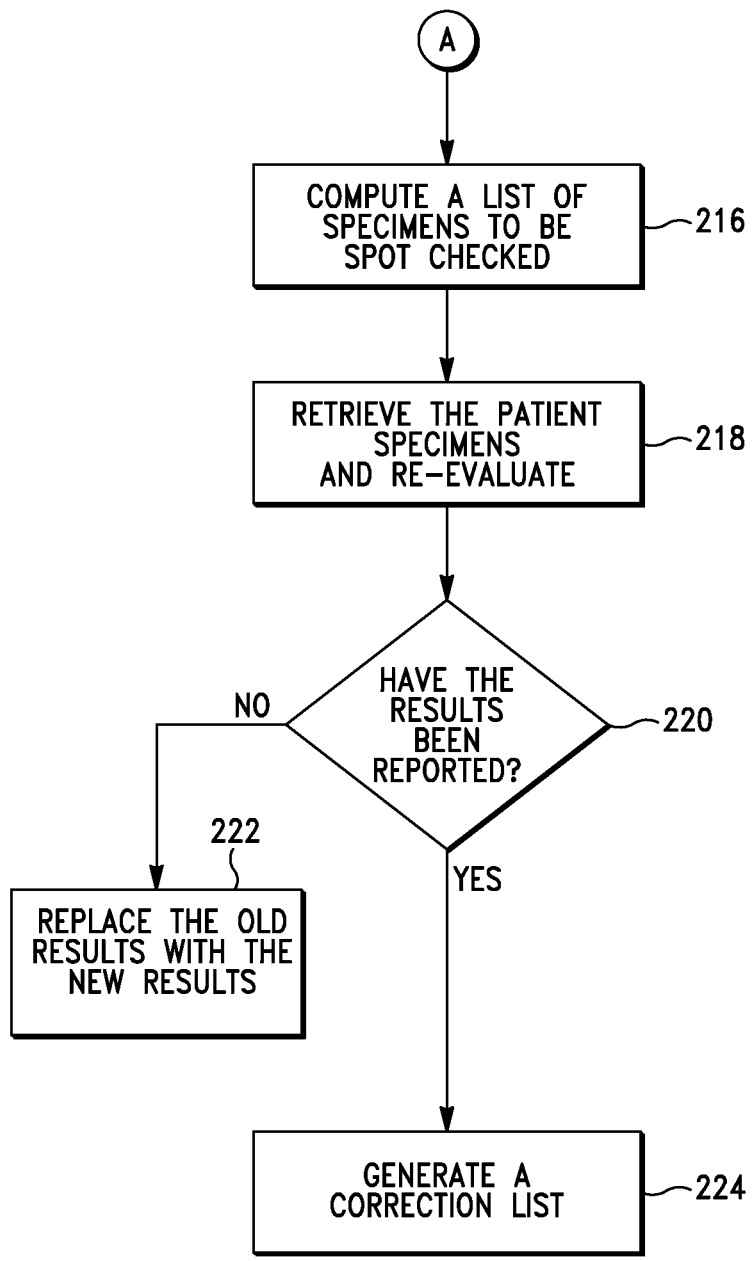
FIG. 3B depicts a second portion of a flow diagram of a process for spot-checking small out-of-control conditions of a clinical diagnostic process according to an exemplary embodiment of the present invention.

The operation of spot-check module 26 will now be described with particular reference to FIGS. 3A and 3B, depicting a flow diagram of an exemplary embodiment of the process for use with an individual clinical diagnostic process or with a group of clinical diagnostic processes, such as in a multi-instrument or multi-laboratory environment.

The method of the present invention automatically characterizes small out-of-control conditions and predicts the number of unreliable patient specimen results that have been generated since the last known good quality control evaluation. The method further identifies the patient specimens at the greatest risk of being unreliable, and reevaluates or spot-checks those specimens after the out-of-control condition has been remedied. Corrections to reevaluated specimens are thus required only when warranted. In operation, a laboratory will typically implement and run a plurality of clinical diagnostic processes simultaneously, with numerous instruments in operation at any given time, with each of those instruments either running distinct clinical diagnostic processes or, as is often the case, several instruments running the same process.

The method for spot-checking small out-of-control conditions is briefly described as follows: upon detection of an out-of-control condition, the specimen evaluation data that has been collected by a laboratory instrument is analyzed to determine the scope of the potential error in that data. Analysis of that data involves estimating the magnitude of the out-of-control condition, estimating the probability of the specimen data of being incorrect, and computing a predicted number of incorrect results expected within that specimen data. If the magnitude of the out-of-control condition is found to be too high (e.g., the magnitude exceeds a predetermined threshold), then the spot-checking method is not suitable and another method of recovery should be employed. If the magnitude of the out-of-control condition is found to be too low (e.g., the magnitude falls short of a predetermined threshold) then no spot-checking is required because the error is within an allowable tolerance. If the magnitude of the out-of-control condition falls between those thresholds, then the spot-checking method is applied after the out-of-control condition is resolved. A list of specimens to be spot checked is generated, and those specimens are re-evaluated. If the initial results (i.e., the evaluation of the specimens prior to detection of the out-of-control condition) have been published or reported, then a correction list having the results of the re-evaluation of the specimens is generated. If the initial results have not been published, then the initial results are replaced by the results of the re-evaluation of the patient specimens.

Referring now to FIGS. 3A and 3B, a flow diagram of an exemplary embodiment of the spot-checking method of the present invention is depicted. For each clinical diagnostic processes with which the spot checking system and method of the present invention is to be used, a laboratory must initially define several process parameters as follows:

NUMREP—is the number of replicates at each quality control (QC) concentration level to be used to estimate the size of the out-of-control condition. Typically NUMREP will preferably be in the range of 2 to 4, although values outside of that range may be appropriate depending on the specific clinical diagnostic processes and/or specific analytes.

$TE_a$—is the allowable total error for the clinical diagnostic process. The value of $TE_a$ is typically determined by the operator of the laboratory, preferably in consideration of the technical capability and the clinical utility of the analyte. $TE_a$ is preferably based as a percentage or based on a function that assigns a value for $TE_a$ based on a concentration of the analyte.

MAXNI—is the maximum number of predicted incorrect results for spot checking. MAXNI is preferably selected based on the number of patient specimens that are evaluated between quality control (QC) events. As will be explained in more detail below, if the predicted number of incorrect results exceeds MAXNI, then spot-checking may not be suitable and other recovery procedures may be used.

PILO—is the lowest probability of an incorrect result to be considered when determining which specimens need to be spot checked due to their proximity to a medical decision limit.

PIMIN—is the minimum probability of an incorrect result to be considered when determining which specimens need to be spot checked due to a high probability of being incorrect.

Preferably, a laboratory operator will determine default or initial values of NUMREP, $TE_a$, MAXNI, PILO, and PIMIN based on the laboratory's history and knowledge of the various clinical diagnostic processes being implemented and the type of analytes being processed. Of course, as the laboratory's knowledge base increases, adjustments or changes to the initial or default values may be implemented as necessary within the scope of the present invention.

With the initial parameters for a particular clinical diagnostic process defined and set-up as just described, the general process steps for implementing the spot checking method of the present invention are depicted in the flow diagram of FIGS. 3A and 3B. Each step will first be described generally; a more detailed description of each step in the process is set forth below.

Looking to FIGS. 3A and 3B, when an out-of-control condition is identified, spot checking of the condition begins at block 200 where an estimate of the magnitude of the out-of-control condition is made across the concentration range of the patient results.

At block 202, for every specimen evaluated since the last good quality control evaluation, the probability of that evaluation being incorrect is estimated.

At block 204, the expected number of incorrect results ($N_I$) evaluated since the last good quality control evaluation is computed.

At block 206, if the calculated expected number of incorrect results $N_I$ is greater than the predefined threshold (MAXNI) for spot checking, then another recovery method should be used and the spot checking process terminates at block 208. As discussed above, the spot checking process of the present invention is suitable for use with small out-of-control conditions. If the out-of-control condition is larger than the predetermined threshold, MAXNI, then another method of recovering from the out-of-control condition will likely be more suitable. Other methods of recovery, such as simply re-testing every specimen since the last good QC event, will be apparent to those skilled in the art and are discussed above.

If the out-of-control condition does not exceed the MAXNI threshold, then the process continues at block 210, where it is determined if the estimated number of incorrect results $N_I$ is less than 1. If so, then no spot checking is necessary (because there are no, or less than one, incorrect results) and the spot checking process terminates at block 212, at which point regular testing can be resumed.

If the estimated number of incorrect results ($N_I$) is not less than 1, then the spot checking process continues at block 214 where the out of control condition is resolved. It will be apparent to one skilled in the art that the potential causes of out-of-control conditions are numerous and the required actions to resolve the malfunction are varied.

With the out-of-control condition resolved, at block 216 a list of patient specimens to be spot checked is computed. The list includes patient specimens: (1) with a high probability of being incorrect or (2) with a significant chance of crossing a medical decision limit due to the out-of-control condition.

At block 218 the patient specimens identified in the list are retrieved and reevaluated, generating new results for each of those specimens.

At block 220 it is determined whether the initial results for the patient specimens identified in the list were already reported or published.

If the results were not reported, then at block 222 the old results are replaced with the new results.

If the results were already reported, then at block 224 a correction list is generated having the results of any specimen where: (1) the new result is on a different side of a medical decision limit from the old result (e.g., the new result has changed the outcome of the medical decision) or (2) the new result differs from the old result by more than the allowable total error $TE_a$ (e.g., the new result varies from the old result by more than an allowable amount).

Thus, the spot-checking process of the present invention allows identification of the specific specimens that need to be re-evaluated upon the occurrence of an out-of-control condition. With the process set forth generally, each of the above-described steps will now be described in more detail, still with reference to FIGS. 3A and 3B.

At block 200, the magnitude of the out-of-control condition is evaluated as follows:

First, a selected number of quality control (QC) specimens are evaluated for each QC level currently being tested by the clinical diagnostic process. Preferably, the selected number of quality control specimens is NUMREP, as initially set-up as described previously.

Next, using the results of the QC evaluation just performed, a bias function is constructed for each concentration x of QC being considered as:

bias(x)=MEAN(QC result)−MEAN (QC target level)

It should be understood that this calculation should include the values of QC results from the QC event result that failed.

For concentrations x that fall between QC levels, the bias is calculated by linearly interpolating between those QC levels. For concentrations above or below QC levels the bias is truncated such that for concentrations above the highest level of QC, the bias of the highest level of QC is used and for concentrations below the lowest level of QC, the bias level of the lowest level of QC is used.

Next, using historic QC results, an imprecision function is constructed for each concentration x of QC being considered as:

SD(x)=analyte concentration (x)

In other words, for each concentration of QC being considered, the analyte concentration for that level is assigned to SD(x).

In cases where the concentrations that fall between QC levels, the SD is calculated by linearly interpolating between those QC levels. For concentrations above or below QC levels the SD is truncated such that for concentrations above the highest level of QC, the SD of the highest level of QC is used; and for concentrations below the lowest level of QC, the SD level of the lowest level of QC is used.

Thus, for each value in the patient data, the concentration of that patient sample is compared to the concentrations in the specimen tuples (concentration, SD) for the laboratory instrument on which the patient value was obtained. When there is a direct match between the patient concentration and a concentration in the tuples, the corresponding SD from the tuple is assigned to that patient sample. Note that a direct match may be considered either an exact match of concentrations, or a match within a predetermined threshold (e.g., if the patient concentration is within 0.1 percent of the concentration in the specimen data). When a patient concentration does not directly match any of concentrations represented in the tuples, the SD's for the patient data are calculated by interpolating as just described above and truncated when the SD's exceed upper or lower thresholds.

In an alternative exemplary embodiment, the SD's for the patient data are calculated by interpolating or extrapolating from the SD's in the tuples as follows:

When a patient concentration falls between the concentrations of two tuples, (where the lower concentration tuple is designated ($conc_0$ $SD_0$) and the higher concentration tuple is designated ($conc_1$, $SD_1$)) the SD for the patient data ($SD_p$) is calculated as $SD_p = SD_0 + (\text{concentration} - conc_0)*(SD_1 - SD_0)/(conc_1 - conc_0)$ When a patient concentration falls below the lowest (concentration, SD) tuple, designated ($conc_l$, $SD_l$), the SD value of that lowest concentration tuple is assigned to the patient SD, as $SD_p = SD_l$.

Finally, when a patient concentration is higher than the highest (concentration, SD) tuple, designated ($conc_h$, $SD_h$) the value of the assigned patient SD is calculated as $SD_p = (SD_h/conc_h)*(\text{patient concentration})$.

Thus, for each patient value, a SD is assigned based on either a direct match with the specimen data concentrations, by interpolating between specimen values as described above, or by extrapolating from specimen values. It should be understood that while a simple piecewise linear interpolation function and lower limit truncation function have been described; other interpolation and extrapolation schemes may of course be implemented in accordance with the present invention.

Finally, for every analyte concentration, x, the assigned $TE_a$ (as described above) is used to construct $TE_a(x)$. In the case where $TE_a$ is given as a percentage, this value may be deminimus, e.g., in cases where $TE_a(x) = \% TE_a * x$ With the size of the out-of-control condition estimated, at block 202, for every specimen x evaluated since the last good quality control evaluation, the probability of that evaluation being incorrect (pI(x)) is estimated as follows:

$pI(x) = 1 - \text{normcdf}(TE_a(x), \text{bias}(x), sd(x)) + \text{normcdf}(-TE_a(x), \text{bias}(x), sd(x))$ Where $TE_a(x)$, bias(x), and sd(x) are the functions described above with respect to block 200, and where normcdf is the normal cumulative distribution function:

$$\text{normcdf}(x, \mu, \sigma) = \frac{1}{\sigma\sqrt{2\pi}} \int_{-\infty}^{x} e^{\frac{-(t-\mu)^2}{2\sigma^2}} dt$$

Where $\mu$ is the mean of the distribution for which the normal cumulative distribution is being computed (i.e., in this case, the bias) and a is the standard deviation of the distribution for which the normal cumulative distribution is being computed, and where x is the value for which the normal cumulative distribution is being computed.

With the probability of being incorrect calculated, we move to block 204 where the expected number of incorrect results ($N_I$) evaluated since the last good quality control evaluation is computed as follows:

Assuming that the out-of-control condition has existed since the last good quality control evaluation (i.e., worst case analysis), then the predicted number of incorrect results can be calculated as the sum of the probabilities of any given result being incorrect for all of the patient specimens tested since the last good QC evaluation, or:

$N_I = \sum_{i=1}^{NB} pI_i$,

Where NB is the number of patient specimens tested since the last good QC evaluation.

At block 206, if $N_I$ is greater than MAXNI (as initially defined and described above), then the magnitude of the out-of-control condition is too great, and the spot-checking method is not suitable and another method of recovery must be employed at block 208.

At block 210, if $N_I$ is less than one, then the magnitude of the out-of-control condition is very small and within an acceptable tolerance. Thus, as shown at block 212 there is no need to perform the spot-checking method and the testing of samples can continue.

At block 214, the problem that caused the out-of-control condition is resolved. One skilled in the art will recognize that the potential causes of out-of-control conditions are numerous. Various testing and resolution processes known in the art may be employed to troubleshoot and isolate the cause of any particular error, resolution may require test system maintenance, calibration, changing reagents, or various other actions to identify and resolve malfunctions known in the art.

Turning to FIG. 3B, with the out-of-control condition resolved, the spot-checking process continues at block 216 where a list of patient specimens to be spot-checked or re-evaluated is generated by identifying those specimens with either a high probability of being unreliable or as having a significant chance of crossing a medical decision limit due to the out of control condition.

Patient specimens having a high probability of being incorrect are identified by: sorting the patient specimens by their pI (i.e., their individual probability of being incorrect), selecting $N_I$ (the number of expected incorrect results, as calculated at block 204 above) highest patient specimen result pI's, and removing any of the patient specimens having pI's less than PIMIN (minimum probability of an incorrect result to be considered, as defined initially and described above).

Patient specimens having a significant chance of crossing a medical decision limit due to the out-of-control condition are identified as follows:

For each medical decision limit, compute, for each patient specimen result, the distance of the patient specimen results from the medical decision limit by subtracting the limit from the result. If the bias at the medical decision limit is positive and the computed distance is negative, then remove the patient specimen from consideration (i.e., the result is below the decision limit and could not have crossed the decision limit because of the bias).

If the bias at the medical decision limit is negative and the distance is positive, remove the patient specimen from consideration (i.e., the result is above the decision limit and could not have crossed the decision limit because of the bias).

With the patient specimens removed from consideration as just described, for the remaining specimens replace any negative distances with their absolute values and sort the patient specimens by their distances. Then select the $N_I$ (as described above) patient specimens having the smallest distances and remove any patient specimens that have pI's<PILO (lowest probability of an incorrect result to be considered, as defined initially and described above).

At block 218, the identified patient specimens are retrieved and re-evaluated. In accordance with the selection procedures just described, the number of patient specimens to be re-evaluated will be between zero and $2*N_I$.

Finally, at block 220 it is determined whether the results of the initial evaluation of the patient specimens have been reported or published. If not, at block 222, the initial evaluation results are replaced with the re-evaluation results produced by spot-checking and re-evaluating the patient specimens.

If so, at block 224, a correction list is generated having any specimen results where the new result is on a different side of a medical decision limit from the old results, or where the new result differs from the old result by more than the allowable total error TEA.

Thus, at block 224, a new result is added to the correction list if:

$$|\text{new result} - \text{old result}| > TE_a(\text{new result})$$

Similarly, a new result is added to the correction list if the signs of the results of the following two calculations are different (i.e., if one is positive and one is negative).

$$\text{old result} - \text{decision limit; and new result} - \text{decision limit}$$

However, if the signs of the results of the two calculations are the same, the result of the re-evaluation is not added to the correction list.

Thus, upon detection of an out-of-control condition, the system and method of the present invention automatically characterizes a small out-of-control conditions and predicts the number of unreliable patient specimen results since the last known good quality control evaluation. The system and method further identifies the patient specimens at the greatest risk of being unreliable, and reevaluates or spot-checks those specimens after the out-of-control condition has been remedied. Corrections to reevaluated specimens are thus required only when warranted, avoiding costly, time-consuming, and unnecessary re-testing.

Any quantitative representation presented herein which could permissibly vary without resulting in a change in the basic function to which it is related may permissibly vary from that if the variance does not materially alter the capability of the invention.

While the present invention has been described and illustrated hereinabove with reference to various exemplary embodiments, it should be understood that various modifications could be made to these embodiments without departing from the scope of the invention. Therefore, the invention is not to be limited to the exemplary embodiments described and illustrated hereinabove, except insofar as such limitations are included in the following claims.

What is claimed and desired to be secured by Letters Patent is as follows:

1. A system for detecting small out-of-control conditions in a clinical diagnostic process and identifying unreliable specimens for retesting, the system comprising:
   a clinical diagnostic analyzer comprising:
      a processor;
      a user interface device in communication with the processor; and
      a display in communication with the processor; wherein the user interface accepts input from a user and wherein the display presents information to a user;
   wherein, upon receiving user input from the user interface device, the clinical diagnostic analyzer performs an analyzing step, wherein the clinical diagnostic analyzer analyzes a plurality of specimens and, upon analyzing a specimen and detecting an out-of-control condition, the clinical diagnostic analyzer sends a notification and the processor executes steps of:
      spot-checking the analysis results to determine the existence of a small out-of-control condition which renders only a fraction of specimens evaluated by during the existence of the condition to be unreliable;
      analyzing collected specimen test data by:
         (i) estimating a magnitude of the small out-of-control condition from quality control specimens using bias functions and historic imprecision data, (ii) calculating, for each patient specimen, a probability of being incorrect using a normal cumulative distribution function, and
(iii) computing a predicted number of incorrect results as the sum of said probabilities, to thereby determine a scope of potential error since the last known good quality control evaluation;
identifying specimens to be re-evaluated based on the analyzing step;
generating a report of identified specimens wherein the processor, prior to re-evaluating, automatically generates a list of specific patient specimens selected as having:
(i) the highest probabilities of being incorrect above a predetermined minimum probability of being incorrect,
(ii) proximity to one or more medical decision limits with probabilities of being incorrect above a predetermined lowest probability of being incorrect;
re-evaluating the identified specimens after the out-of-control condition is resolved; and
wherein the clinical diagnostic analyzer is configured such that it can perform the analyzing step on a plurality of specimens simultaneously using distinct or redundant diagnostic processes.

2. The system of claim 1, wherein analyzing collected specimen test data comprises estimating a magnitude of the out-of-control condition, estimating a probability of a specimen evaluation being incorrect, computing a predicted number of incorrect test results, and combinations thereof.

3. The system of claim 2, wherein estimating a magnitude of the out-of-control condition comprises evaluating quality control specimens and determining an allowable total error based on bias and historic imprecision data.

4. The system of claim 2, wherein estimating a probability of a specimen evaluation being incorrect comprises calculating a normal cumulative distribution.

5. The system of claim 2, wherein computing a predicted number of incorrect test results comprises calculating a sum of probabilities of a specimen evaluation being incorrect.

6. The system of claim 1, wherein the processor is further operable to replace at least a portion of the collected specimen test data with re-evaluated specimen data.

7. The system of claim 1, wherein the test data comprises patient data.

8. The system of claim 1, wherein the generated report of identified specimens is presented on the display.

9. A method for detecting small out-of-control conditions in a clinical diagnostic process and identifying unreliable specimens for retesting, the method comprising:
a clinical diagnostic processor comprising:
a processor;
a user interface device in communication with the processor; and
a display in communication with the processor;
wherein the user interface accepts input from a user and wherein the display presents information to a user;
receiving user input from the user interface device;
an analyzing step, comprising analyzing a plurality of specimens and, upon analyzing a specimen and detecting an out-of-control condition, sending a notification and:
spot-checking the analysis results to determine the existence of a small out-of-control condition which renders only a fraction of specimens evaluated by during the existence of the condition to be unreliable;
analyzing collected specimen test data by:
(i) estimating a magnitude of the small out-of-control condition from quality control specimens using bias and imprecision functions,
(ii) calculating a probability of each specimen evaluation being incorrect with a normal cumulative distribution, and
(iii) computing a predicted number of incorrect results as a sum of the specimen probabilities to determine the scope of potential error;
generating a report of identified specimens wherein generating the report comprises automatically identifying patient specimens to be re-evaluated that either:
(i) exceed a predetermined minimum probability of being incorrect, or
(ii) are closest to a medical decision limit with probabilities of being incorrect above a predetermined lowest probability of being incorrect,
and producing a correction list if re-evaluated results differ from reported results by more than an allowable total error;
re-evaluating the identified specimens after the out-of-control condition is resolved; and
performing the analyzing step on a plurality of specimens simultaneously using distinct or redundant diagnostic processes.

10. The method of claim 9, wherein analyzing collected specimen test data comprises estimating a magnitude of the out-of-control condition, estimating a probability of a specimen evaluation being incorrect, computing a predicted number of incorrect test results, and combinations thereof.

11. The method of claim 10, wherein estimating a magnitude of the out-of-control condition comprises evaluating quality control specimens and determining an allowable total error based on bias and historic imprecision data.

12. The method of claim 10, wherein estimating a probability of a specimen evaluation being incorrect comprises calculating a normal cumulative distribution.

13. The method of claim 10, wherein computing a predicted number of incorrect test results comprises calculating a sum of probabilities of a specimen evaluation being incorrect.

14. The method of claim 10, further comprising:
replacing at least a portion of the collected specimen test data with re-evaluated specimen data.

15. The method of claim 9, wherein the test data comprises patient data.

16. The method of claim 9, wherein the generated report of identified specimens is presented on the display.

* * * * *